United States Patent [19]
Nishimura et al.

[11] Patent Number: 4,624,105
[45] Date of Patent: Nov. 25, 1986

[54] HYDRAULIC TORQUE CONVERTER

[75] Inventors: Sadanori Nishimura; Noboru Sekine, both of Saitama, Japan

[73] Assignee: Honda Giken Kogyo Kabushiki Kaisha, Tokyo, Japan

[21] Appl. No.: 720,034

[22] Filed: Apr. 4, 1985

Related U.S. Application Data

[63] Continuation of Ser. No. 466,323, Feb. 14, 1983, abandoned.

[30] Foreign Application Priority Data

Mar. 9, 1982 [JP] Japan .................................. 57-35814

[51] Int. Cl.$^4$ ............................................ F16D 33/00
[52] U.S. Cl. ........................................ 60/361; 60/365
[58] Field of Search ................. 60/330, 341, 345, 346, 60/361, 362, 364, 365, 366, 377

[56] References Cited

U.S. PATENT DOCUMENTS

| | | | |
|---|---|---|---|
| 1,749,528 | 3/1930 | Freudenreich et al. | 416/223 A |
| 2,585,851 | 2/1952 | Salerni | 60/341 |
| 3,385,060 | 5/1958 | Lazarus | 60/341 |
| 3,475,108 | 10/1969 | Zickuhr | 416/223 A |
| 3,503,209 | 3/1970 | Loffelholz . | |
| 3,507,118 | 4/1970 | Yamaguchi et al. | 60/345 |

FOREIGN PATENT DOCUMENTS 567073 12/1958 Canada .................................. 60/341

Primary Examiner—Edward K. Look
Attorney, Agent, or Firm—Lyon & Lyon

[57] ABSTRACT

A hydraulic torque converter having an impeller, a turbine and a stator form a torus which has a median section of radial size larger than its axial size. The impeller and the turbine are configured to satisfy the relationship of $R \cdot b = K$. The stator has vanes each of varying cross-section thickness and shaped in the form of a wing, and the stator is configured so as to satisfy the relationship $R \cdot b > K$, where R indicates the distance of the converter axis from the center of a circle located in each of the impeller, turbine and stator touching the inner and outer wall of the torus, b indicates the diameter of each circle, K equals a constant, whereby a meridian velocity on the median line is maintained substantially constant.

2 Claims, 3 Drawing Figures

HYDRAULIC TORQUE CONVERTER

This is a continuation of application Ser. No. 466,323, filed Feb. 14, 1983 now abandoned.

This invention relates to an hydraulic torque converter which is comprised of three components, that is, an impeller, a turbine and a stator, and adapted for use in a vehicle or for other uses. Fundamentally, the hydraulic torque converter of this type is required to have a higher torque ratio in a low speed ratio range of the converter and to reduce the slipping loss in a high speed ratio range. To meet the above requirements, as shown e.g. from U.S. Pat. No. 3,503,209, conventional hydraulic torque converters include the so-called flat type which is constructed such that an impeller, a turbine and a stator are arranged to form a torus which has a median section having a radial size larger than its axial size. Also, each of the vanes of the above three components is configured so as to satisfy the following continuity equation:

$$Q = 2\pi R \cdot b \cdot Cm;$$

where,
- $Q$: flow rate per unit time;
- $R$: the distance of the converter axis from the center of a circle located in each of said three components and touching the inner and the outer wall of the torus, as regarded in an axial plane;
- $b$: the diameter of the above circle (fluid passage height); and
- $Cm$: meridian velocity on the median line of the fluid flow. Cm is constant, for the purpose of preventing a collision loss, a vortex or a cavitation of the fluid flowing in the torus.

That is, each vane of the impeller, the turbine and the stator is configured so as to satisfy the following equation:

$$R \cdot b = K \text{ (K is a constant)}$$

Further, it is apparent from the following equation representing the torque relationship between the three components that a larger torque ratio in a low speed ratio of the converter can be obtained by increasing the stator torque:

$$T_1 + T_3 = T_2$$

- $T_1$: impeller torque;
- $T_2$: turbine torque;
- $T_3$: stator torque.

To increase the stator torque, it is necessary to increase the angle of deflection of fluid by the stator. However, this requires the stator to perform directional change of fluid at larger angles than that performed by the impeller or the turbine. If the stator is provided with metal-plate vanes having a thickness similar to that used in the impeller and the turbine, there can occur vortices or flow-separations in the fluid flow, as well as an increased collision loss. It is therefore desired to provide the stator with wing-shaped vanes to obtain a smooth fluid flow.

However, the wing-shaped vanes of the stator inevitably have a large thickness such as to provide narrower fluid passages formed between vanes of the stator, as compared with those of the other two components, which causes fluctuations in the meridian velocity Cm of the fluid flow on the median line, resulting in a turbulence in the flow and accordingly a low torque conversion efficiency.

The object of this invention is to provide an hydraulic torque converter which has overcome the above-mentioned disadvantage, and which comprises an impeller, a turbine and a stator, which are arranged to form a torus which has a median section having its radial size larger than its axial size, and each vane of the stator having the shape of a wing. Further, according to the invention, the impeller and the turbine are configured so as to satisfy the relationship of $R \cdot b = K$ (K is a constant), while the stator is configured so as to satisfy the relationship of $R \cdot b > K$. The purpose is to make the meridian velocity Cm of the fluid flow on the median line constant, provided that R indicates the distance from the converter axis to the center of a circle located in each of the three components and touching the inner and the outer wall of the torus, and that b indicates the diameter of the circle.

Other objects and advantages will appear hereinafter.

Figure 1:
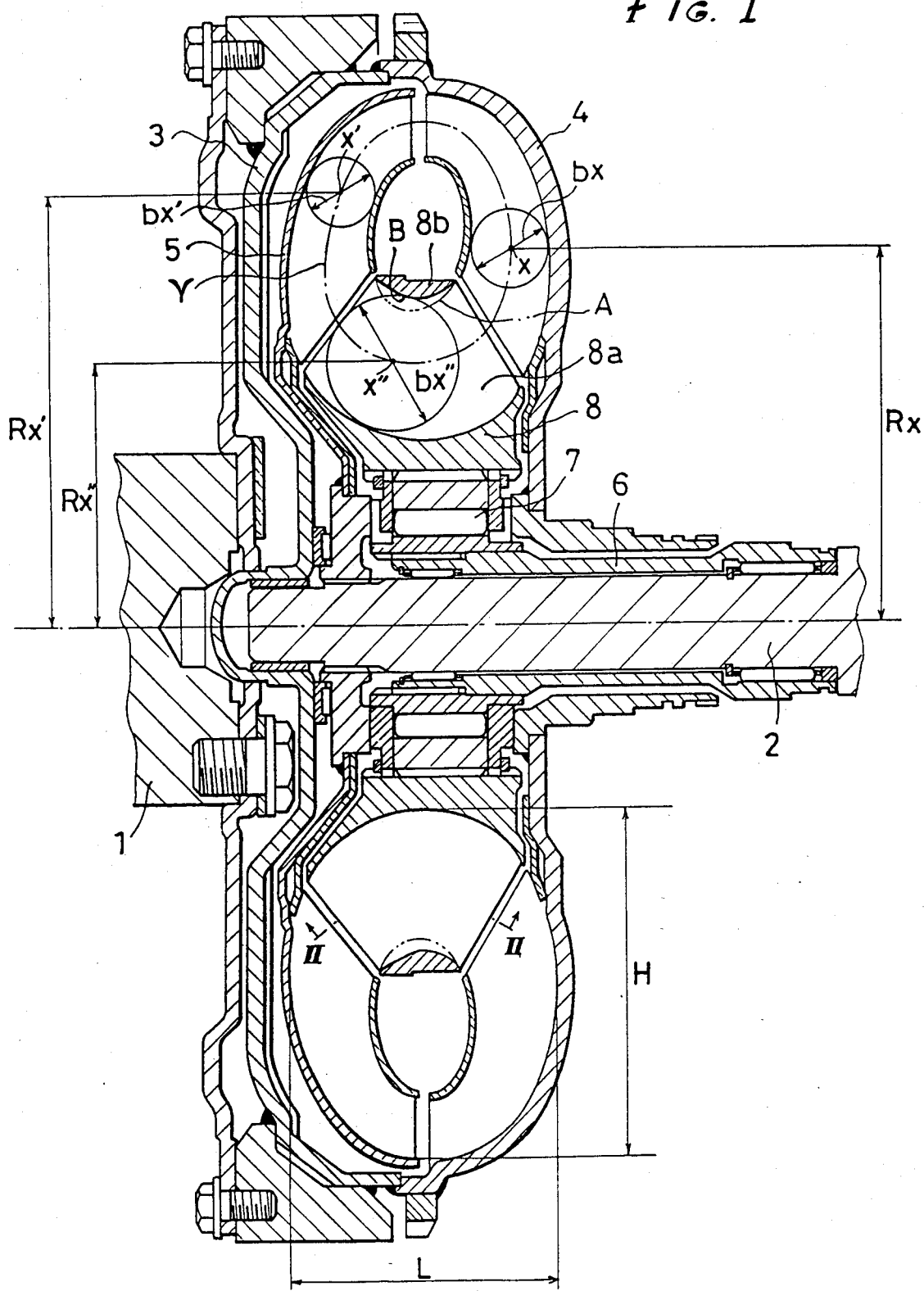
FIG. 1 is a sectional side view of an hydraulic torque converter according to a preferred embodiment of the invention.

Referring to the drawings, FIG. 1 illustrates an hydraulic torque converter according to the invention, which has an input shaft 1 connected to an engine and an output shaft 2 connected to a load, the input and output shafts being disposed in coaxial and end-to-end facing relation. The converter further includes an impeller 4 on a rear side, coupled to the input shaft 1 through an input case 3, a turbine 5 on a front side, coupled to the output shaft 2, and an intermediate stator supported on a hollow stator shaft 6 encircling the output shaft 2. The stator 8 is connected to the stator shaft through a one-way clutch 7. The impeller 4, the turbine 5 and the stator 8 are arranged so as to form a torus having a median section which has a larger radial size H than its axial size L, and accordingly the converter has a generally flat configuration.

Figure 2:
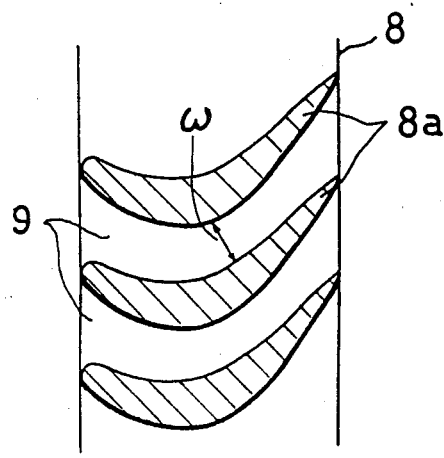
FIG. 2 is a sectional view taken on line II—II of FIG. 1.

Vanes 8a of the stator 8 are shaped in the form of wings as shown in FIG. 2. Each vane 8a of the stator 8 is so thickened that fluid passages 9 defined between the vanes 8a each have a smaller width $\omega$ than the width of passages defined between vanes of the impeller 4 or the turbine 5.

In the aforementioned conventional flat type converter, having metal-plate vanes of thickness similar to those of the turbine and impeller, a reduced width $\omega$ of the passages 9 causes changes in the meridian velocity Cm on the median line $\gamma$ of flow in the torus at the stator 8, resulting in turbulences in the flow. According to the present invention, the inner core 8b of the stator 8 has a profile B indicated by the solid line in FIG. 1 (as distinct from the conventional profile A indicated by the phantom line in FIG. 1) which satisfies the relationship of $R \cdot b > K$. This profile B brings about an increase in the fluid passage height corresponding to the reduction in the width $\omega$ of the passages 9 so that the fluid passage has a constant area along its whole length, maintaining the meridian velocity Cm constant.

In this structure of the hydraulic torque converter, the impeller 4, the turbine 5 and the stator 8 are configured so as to satisfy the following relationships, provided that x, x' and x" each indicate arbitrary points located on the median line, and in the impeller 4, the turbine 5, and the stator 8, respectively:

$$Rx \cdot bx = Rx' \cdot bx' = K$$
$$Rx'' \cdot bx'' > K$$

The increase in the fluid passage height $bx''$ of the stator 8 enables the stator 8 to receive a larger torque from the fluid due to its correspondingly increased pressure receiving surface area, which results in an increased deflection angle of fluid caused by the stator 8 as well as an increased torque ratio in the low speed ratio range of the converter.

Figure 3:
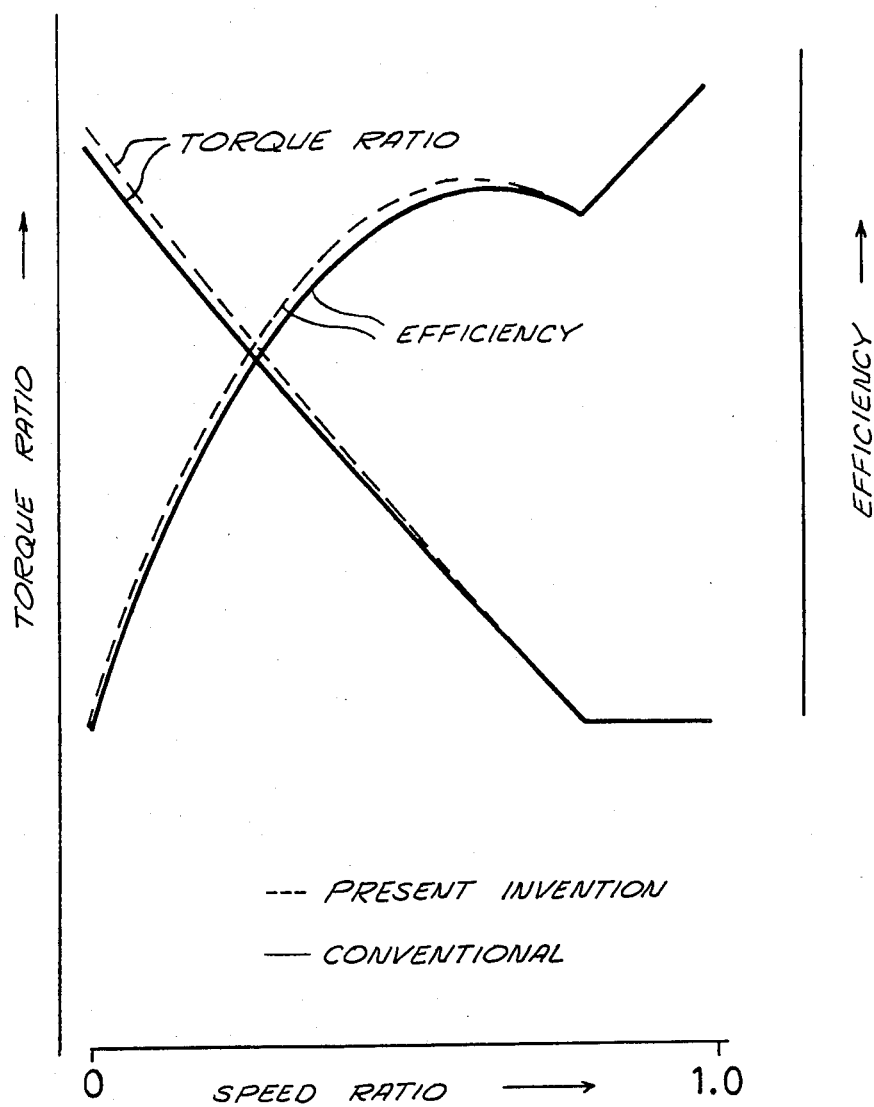
FIG. 3 is a graph showing operating characteristics of hydraulic torque converters.

FIG. 3 compares the operating characteristics of a conventional hydraulic torque converter with those of the device of this invention. In the conventional device (solid line) the stator 8 has the profile indicated by the phantom line A in FIG. 1 and satisfies the relationship of $Rx'' \cdot bx'' = K$. The operating characteristics of the device of this invention are shown in dashed lines in FIG. 3. As is evident from the graph of FIG. 3, a higher torque ratio and accordingly a higher torque converting efficiency can be obtained in a low speed ratio range according to the present invention.

As described above, this invention provides a flat type hydraulic torque converter in which the stator has its vanes shaped in the form of wings, characterized in that the vanes of the stator are configured to increase the fluid passage height so as to satisfy the relationship of $R \cdot b > K$, instead of the conventional configuration which satisfies the relationship of $R \cdot b = K$. As a consequence, the decrease in the width of the fluid passages defined between the vanes of the stator is compensated for by the increase in the fluid passage height. This contributes to prevention of a turbulence in the fluid flow caused by changes in the meridian velocity Cm of the fluid on the median line, and contributes further to an increase of torque received by the stator 8 due to its increased fluid passage height. Thus, a more efficient hydraulic torque converter is provided which has an increased torque ratio in a low speed ratio range.

Having fully described our invention, it is to be understood that we are not to be limited to the details herein set forth but that our invention is of the full scope of the appended claims.

We claim:

1. In an hydraulic fluid type torque converter having an impeller, a turbine and a stator arranged to form a torus, the improvement comprising, in combination: the impeller and the turbine being configured so as to satisfy the relationship $R \, b = K$, said stator having a plurality of vanes each shaped in the form of a wing having a thickened central portion in the direction of fluid flow forming fluid passages between said vanes of reduced width between said thickened central portions, said vanes having a longer radial height at said thickened central portions than upstream and downstream thereof and thereby forming fluid passages of substantially constant cross-sectional area of width multiplied by height along the length of the passage, and said stator being configured so as to satisfy the relationship $R \, b \geq K$, where R equals the distance from the converter axis to the center of any circle located on a radial plane in each of the impeller, turbine and stator, which circle touches the inner and the outer walls of the torus, b equals the diameter of each said circle; and K is a constant, whereby the meridian velocity of the hydraulic fluid on the median line for the impeller, the turbine, and the stator is maintained substantially constant.

2. In an hydraulic fluid type torque converter, comprising, an impeller, a turbine and a stator arranged to form a torus, the torus having a median section in which the radial size is larger than the axial size, the impeller and the turbine being configured so as to satisfy the relationship $R \, b = K$, said stator having a plurality of vanes each shaped in the form of a wing of varying cross-sectional thickness having a thickened central portion in the direction of fluid flow forming fluid passages between said vanes of reduced width between said thickened central portions, said vanes having a longer radial height at said thickened central portions than upstream and downstream thereof and thereby forming fluid passages of substantially constant cross-sectional area of width multiplied by height along the length of the passage, and said stator being configured so as to satisfy the relationship $R \, b \geq K$, where R equals the distance from the converter axis to the center of any circle located on a radial plane in each of the impeller, turbine and stator, which circle touches the inner and the outer wall of the torus, b equals the diameter of each said circle; and K is a constant, whereby the meridian velocity of the hydraulic fluid on the median line for the impeller, the turbine and the stator is maintained substantially constant.

* * * * *